United States Patent
Wagner

(10) Patent No.: US 10,281,036 B2
(45) Date of Patent: May 7, 2019

(54) METHOD FOR CONTROLLING A HYDROSTATIC DRIVE

(71) Applicant: Robert Bosch GmbH, Stuttgart (DE)

(72) Inventor: Horst Wagner, Niederstotzingen (DE)

(73) Assignee: Robert Bosch GmbH, Stuttgart (DE)

( * ) Notice: Subject to any disclaimer, the term of this patent is extended or adjusted under 35 U.S.C. 154(b) by 192 days.

(21) Appl. No.: 14/948,954

(22) Filed: Nov. 23, 2015

(65) Prior Publication Data

US 2016/0169382 A1 Jun. 16, 2016

(30) Foreign Application Priority Data

Nov. 28, 2014 (DE) ........................ 10 2014 224 337

(51) Int. Cl.
| | |
|---|---|
| *F16H 61/465* | (2010.01) |
| *F16H 61/4008* | (2010.01) |
| *F16H 61/47* | (2010.01) |
| *F16H 61/472* | (2010.01) |
| *F16H 61/42* | (2010.01) |
| *F16H 61/478* | (2010.01) |

(52) U.S. Cl.
CPC ....... *F16H 61/465* (2013.01); *F16H 61/4008* (2013.01); *F16H 61/42* (2013.01); *F16H 61/47* (2013.01); *F16H 61/472* (2013.01); *F16H 61/478* (2013.01)

(58) Field of Classification Search
None
See application file for complete search history.

(56) References Cited

U.S. PATENT DOCUMENTS

| | | | | |
|---|---|---|---|---|
| 6,202,016 B1 * | 3/2001 | Stephenson | ......... | F16H 61/0403 475/121 |
| 8,261,544 B2 * | 9/2012 | Basana | ................... | B60T 10/04 60/436 |
| 8,585,156 B2 * | 11/2013 | Udagawa | ............. | B60K 7/0015 180/197 |

FOREIGN PATENT DOCUMENTS

| | | |
|---|---|---|
| DE | 10 2010 020 004 A1 | 9/2011 |
| DE | 10 2012 222 717 A1 | 6/2014 |

* cited by examiner

*Primary Examiner* — Michael Leslie
*Assistant Examiner* — Michael Quandt
(74) *Attorney, Agent, or Firm* — Maginot, Moore & Beck LLP

(57) ABSTRACT

A method is used to control a hydrostatic drive including a drive machine, a hydraulic pump coupled to the drive machine, and a hydraulic motor coupled to the hydraulic pump via a hydraulic working circuit. In the method, at least one of multiple manipulated variables of the hydrostatic drive is ascertained and set, in the course of a precontrol, from a specified setpoint value for at least one of the controlled variables, including a pressure in the hydraulic working circuit, a speed of the hydraulic pump, and an output variable of the hydrostatic drive. In the method, the remaining controlled variables and/or manipulated variables are automatically updated.

13 Claims, 12 Drawing Sheets

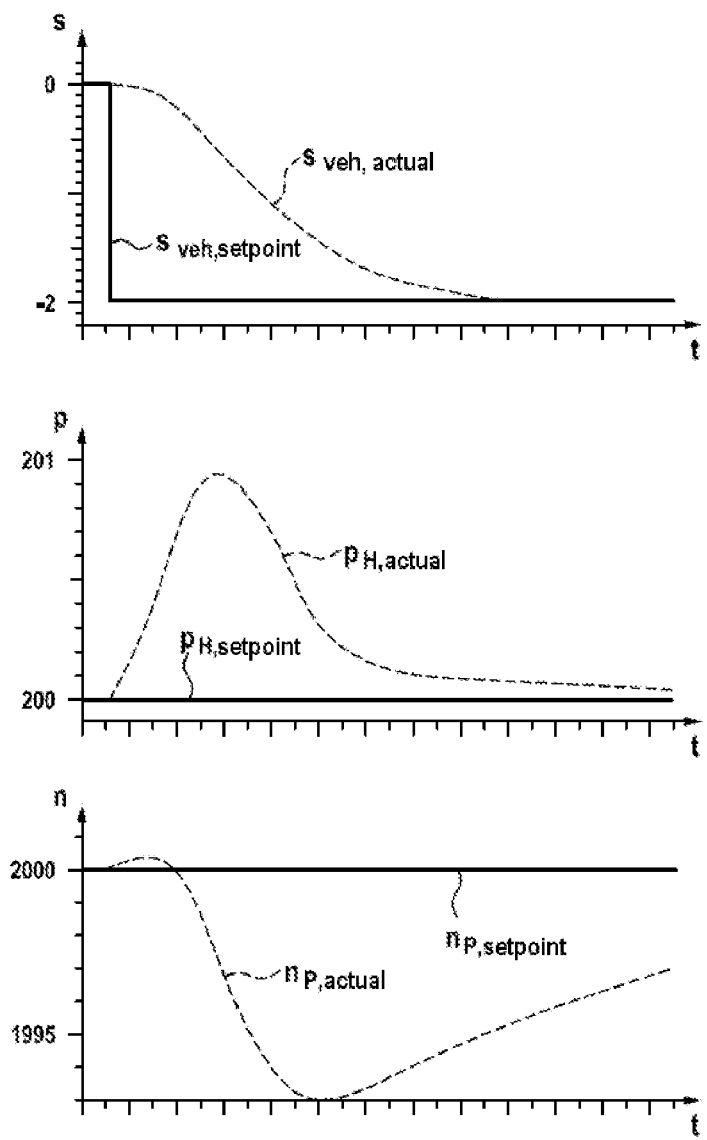

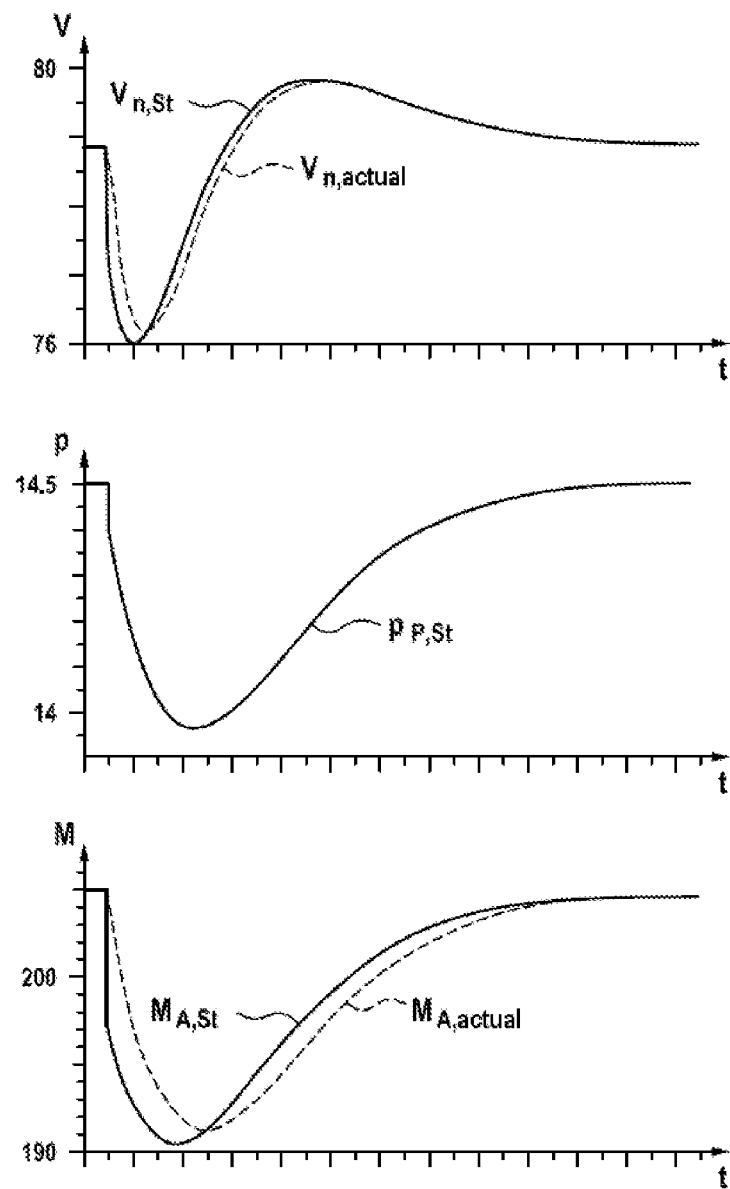

Fig. 5(a)
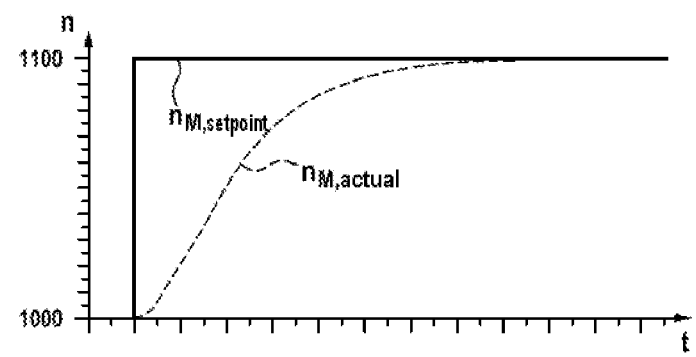
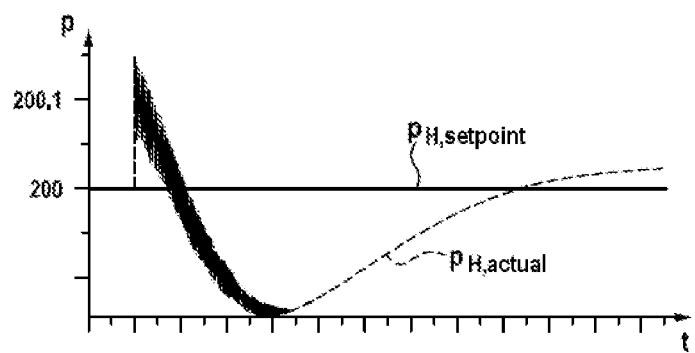
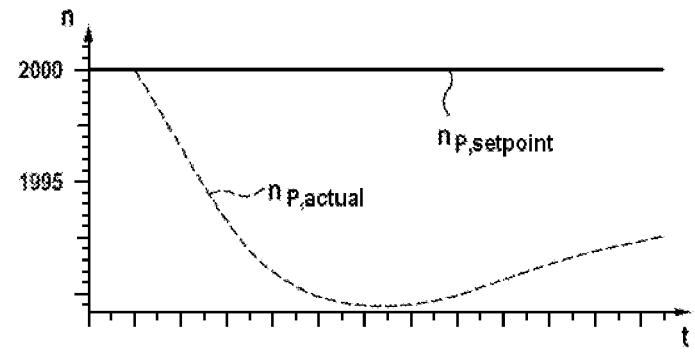

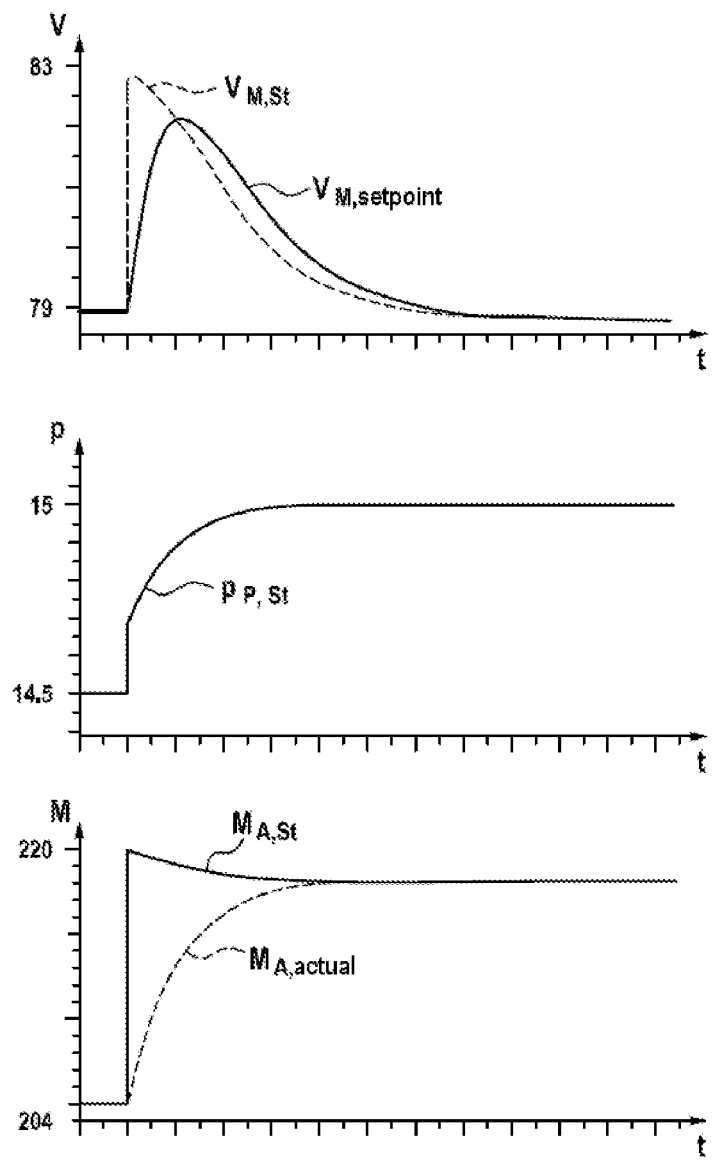

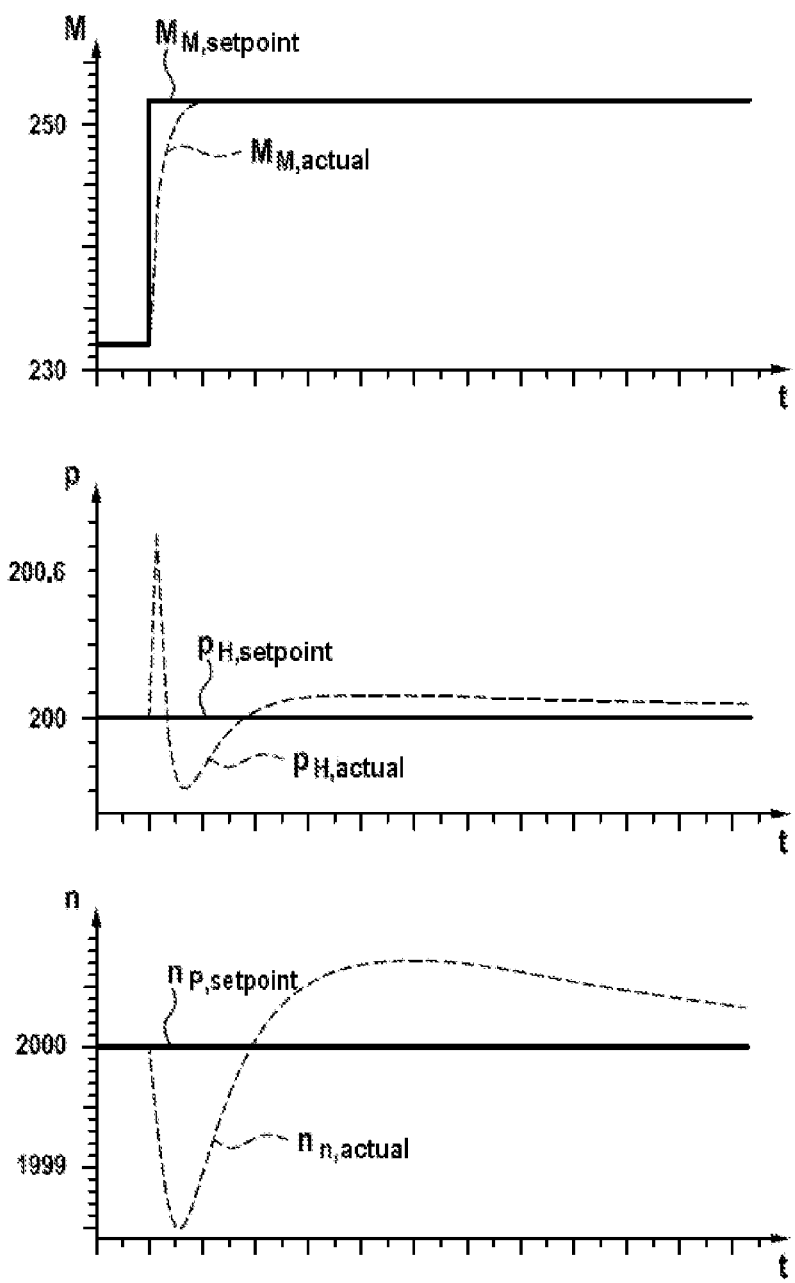

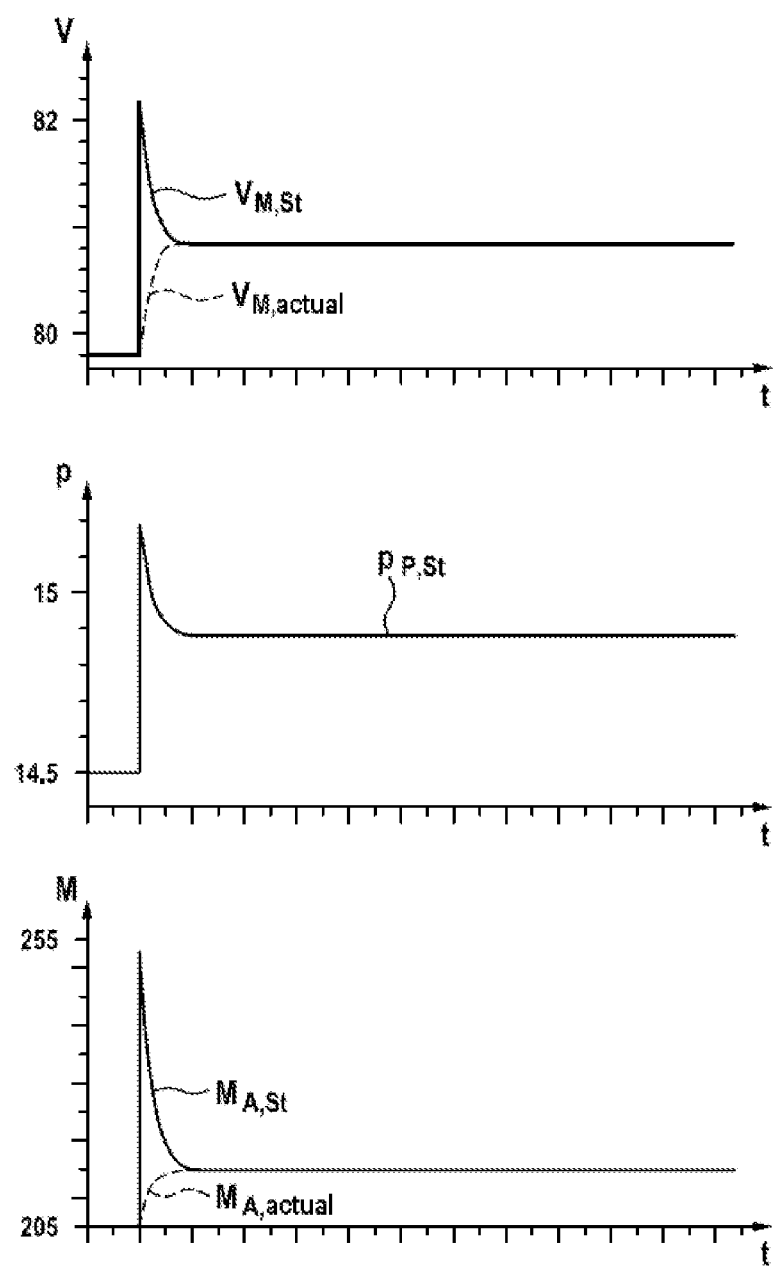

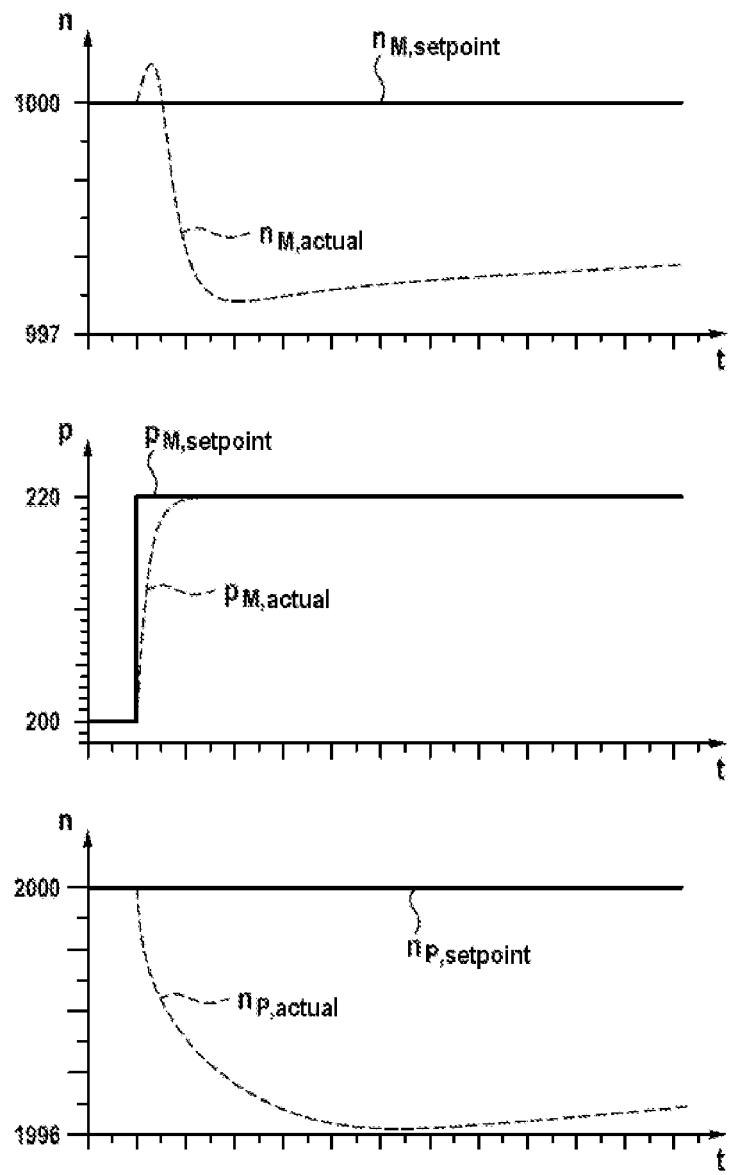

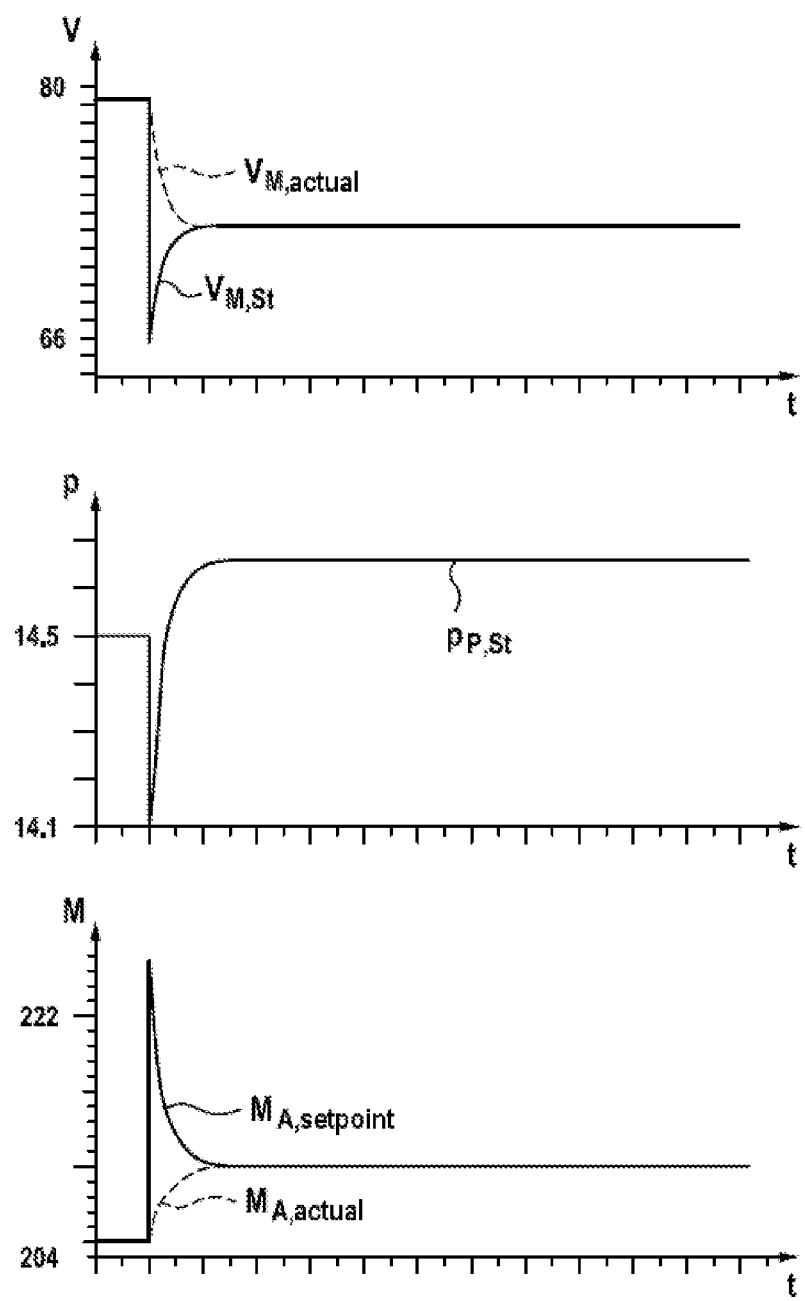

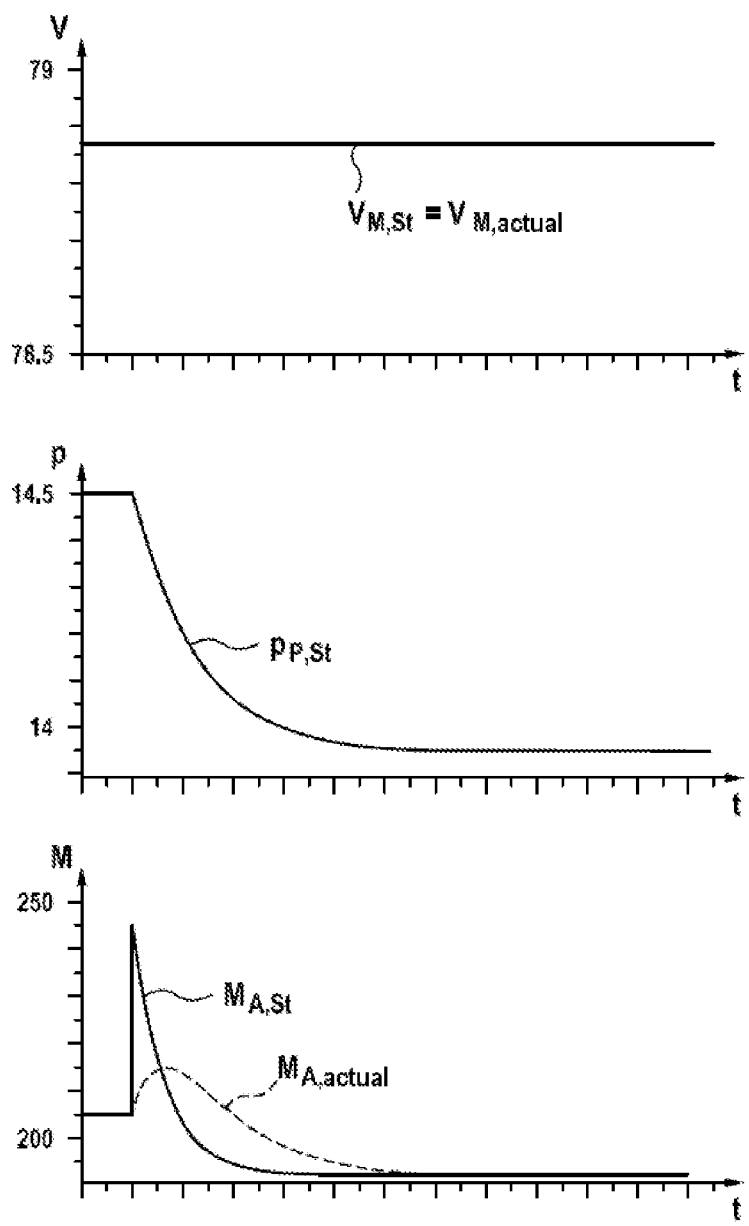

METHOD FOR CONTROLLING A HYDROSTATIC DRIVE

This application claims priority under 35 U.S.C. § 119 to patent application number DE 10 2014 224 337.8, filed on Nov. 28, 2014 in Germany, the disclosure of which is incorporated herein by reference in its entirety.

The present disclosure relates to a method for controlling a hydrostatic drive.

BACKGROUND

Hydrostatic drives were originally controlled mechanically or hydraulically. In this case, a control element is typically assigned to each manipulated variable. Many of the electronically controlled systems used today have incorporated this control concept and usually map the control subtasks onto manipulated variables directly in a unique assignment.

A control, for example, is known from DE 10 2010 020 004 A1, in which torque control on a pump shaft is implemented in the sense of a power or torque controller. For this purpose, a piston displacement of the pump is set via an adjusting device.

In addition, a working pressure can be limited in a hydraulically controlled manner in order to thereby directly limit a tractive force, for example. Such methods can be used, for example, with rodless aircraft tractors.

A moment structure has become established in the automotive field, which coordinates a driver input at different levels with interventions of driving safety systems, assistance systems, transmissions, etc. Moment-based control methods for hydrostatic drives can be used for this purpose. As a precondition therefor, however, the drive system must contain a memory. This is used, for example, in a hydraulic power train (HPT) or with hydraulic regenerative braking (HRB).

Such a hydraulic power train is described, for example, in DE 10 2012 222 717 A1, and such hydraulic regenerative braking is described, for example, in DE 10 2010 020 004 A1.

Due to the direct action by the control elements on the manipulated variables in the methods mentioned, data input into the control system is therefore possible only within the context of the entire machine.

Therefore, it is desirable to enable a separation from a higher-order machine and drive or drive train and thereby permit data input into the drive without the machine.

SUMMARY

According to the disclosure, a method having the features described below is proposed. Advantageous embodiments are the subject matter of the following description.

A method according to the disclosure is suitable for controlling a hydrostatic drive comprising a drive machine, a hydraulic pump coupled to the drive machine, and a hydraulic motor coupled to the hydraulic pump via a hydraulic working circuit. In this connection, at least one of multiple manipulated variables of the hydrostatic drive is ascertained and set, in the course of a precontrol, from a specified setpoint value for at least one of the controlled variables including a pressure in the hydraulic working circuit, a speed of the hydraulic pump, and an output variable of the hydrostatic drive. In addition, the remaining controlled variables and/or manipulated variables are automatically updated.

In other words, the disclosure therefore creates a possibility that an operator no longer needs to specify every manipulated variable individually by means of a control element; instead, he can directly specify a setpoint value (or multiple temporally successive setpoint values) for the controlled variables, which previously could not be directly specified, of pressure in the hydraulic working circuit, the speed of the hydraulic pump, or an output variable of the hydrostatic drive (in particular, the rotational angle, speed or torque of the hydraulic motor). The manipulated variables required to achieve the specified setpoint value are automatically set or updated by the control of the drive. At least one of these manipulated variables is ascertained and set in the course of a precontrol, and the other manipulated variables and controlled variables automatically result in the course of a control, i.e., are automatically updated.

The separation into precontrol and control has the advantage that one or multiple suitable manipulated variables can be specifically sought for each controlled variable specified by the operator, which manipulated variables can be precontrolled in order to obtain the desired result. Ambiguous solutions, which may result in an instability of the control, can also be avoided in this manner.

This permits a separation (encapsulation, information hiding) into a "drive control" domain and a "machine/vehicle" domain, since the drive can be controlled solely by specifying a setpoint value of at least one controlled variable. This setpoint value of the at least one controlled variable, i.e., a physical value, is therefore an interface between the domains, which is easily understood by both domains. Direct action upon a manipulated variable is no longer necessary.

Data input into the drive or the drive train therefore essentially results from the data of the drive components. Moreover, some data on the machine, which are already known during the configuring, can be taken into account. As a result, it is possible to input data into the drive separately, i.e., without the machine. An OEM can therefore work in his "vehicle" domain without influencing the data input of the drive.

A method according to the disclosure implements a different behavior of the drive ("proportional behavior", "load-sensitive behavior") with unchanged control devices for the hydraulic pump and the hydraulic motor. Attempts to reduce the variance among the electrohydraulic components are therefore also supported.

The output variable of the hydrostatic drive preferably includes a rotational angle, a speed or a torque of the hydraulic motor. As an alternative, the hydraulic motor can be coupled to a propulsive drive and the output variable of the hydrostatic drive can include a driving distance, a driving speed, or a tractive force of the propulsive drive. These derived output variables, which are based on a propulsive drive, can be converted to the direct output variables of the hydraulic motor with consideration for transmission ratio and wheel circumference, for example. Depending on whether the hydrostatic drive is used to drive a machine or a vehicle, the controlled variable can therefore be set simply by specifying a setpoint value of a required controlled variable, in particular a controlled variable required for the specific operation of the machine or the vehicle.

A setpoint value for the output variable of the hydrostatic drive and/or the speed of the hydraulic pump is then advantageously specified by a machine, which is driven by the hydrostatic drive, or by a vehicle, which is driven by the hydrostatic drive, or by a control element thereof (e.g., control device). This can be carried out, for example, by an operator of the machine or the vehicle or also as a work order.

A setpoint value for the pressure in the hydraulic working circuit and/or the speed of the hydraulic pump is advantageously specified via the hydrostatic drive, in particular with consideration for the maximum permissible pressure, the efficiency of the hydrostatic drive, the time behavior of components of the hydrostatic drive and/or protection of components of the hydrostatic drive. The pressure in the working circuit is a controlled variable which is intended to be set or changed primarily on the basis of the specifications of the hydrostatic drive and does not directly affect a machine or a vehicle. This pressure can therefore be specified directly via the hydrostatic drive and independently of a machine or a vehicle. The speed of the hydraulic pump can be specified via the machine or the vehicle, as mentioned above. If this does not take place, however, for example because it is not necessary for an intended task, a specification can take place via the hydrostatic drive, for example, with regard to an optimization of the overall efficiency of the hydrostatic drive, including the working machine.

It is advantageous when the multiplicity of manipulated variables of the hydrostatic drive includes a torque of the drive machine and/or a volumetric displacement of the hydraulic machine (for example, indirectly via a control pressure for changing an element which defines the volumetric displacement, for example, for outwardly pivoting the swash plate of the hydraulic pump or, for example, directly via a subordinate hydraulic position controller) and/or a displacement volume of the hydraulic motor (for example, indirectly via a control pressure for changing an element which defines the displacement volume, for example, for outwardly pivoting a swash plate of the hydraulic motor or, for example, directly via a subordinate hydraulic position controller). These manipulated variables are the typical manipulated variables of a hydrostatic drive. In this regard, it is also noted that each of these manipulated variables influences the controlled variables in most cases and, therefore, usually all of these manipulated variables are therefore ascertained and set.

It is particularly advantageous when the precontrol includes trajectory planning on the basis of the setpoint value of the at least one controlled variable for ascertaining the controlled variables across a controlled system. The specifications regarding the controlled variables can therefore be transformed into a time behavior, which can then be implemented via a controlled system.

The precontrol preferably also includes a dynamic path model for ascertaining the at least one manipulated variable from the controlled variables across the controlled system. Therefore, the necessary manipulated variables can be particularly easily set to the present conditions of the hydrostatic drive.

The drive machine advantageously comprises an internal combustion engine (for example, a spark-ignition engine, a compression-ignition engine, or an engine having an external heat supply), an electric machine, or a turbomachine (for example, a turbine or the like).

A method according to the disclosure accounts for a behavior of the drive machine and is therefore open and suitable for all types of drive machines, which themselves can be controlled to implement a torque request. The method is therefore also suited, in particular, for internal combustion engines according to the most recent emissions standards, some of which are distinguished by a delayed torque build-up.

A method according to the disclosure is also compatible and easily combined with electric and mechanical inputs and outputs, which are additionally located in a device driven by a hydrostatic drive. A coordination of concurrent requests can be carried out in an easily understood manner, for example, at the vehicle level. An implementation of hybrids or multicircuit systems is also supported.

A processing unit according to the disclosure, for example, a control device for a hydrostatic drive, is designed, in particular via programming, for carrying out a method according to the disclosure.

The implementation of the disclosure in the form of software is also advantageous, since this makes particularly low costs possible, in particular when an executing processing unit is also used for other tasks and is therefore present anyway. Suitable data carriers for providing the computer program are, in particular, diskettes, hard drives, flash drives, EEPROMs, CD-ROMs, DVDs, among other things. A download of a program via computer networks (Internet, intranet, etc.) is also possible.

Further advantages and embodiments of the disclosure will become apparent from the description and the attached drawing.

It is understood that the features which were mentioned above and which will be explained in the following can be used not only in the particular combination indicated, but also in other combinations or alone without departing from the scope of the present disclosure.

The disclosure is schematically represented in the drawing with reference to exemplary embodiments and is extensively described in the following with reference to the drawing.

BRIEF DESCRIPTION OF THE DRAWINGS

FIGS. 4(a), 4(b), 5(a), 5(b), 6(a), 6(b), 7(a), 7(b), 8(a), and 8(b) show the curves over time of controlled and manipulated variables upon specification of a setpoint value of a controlled variable in each case when a preferred embodiment of a method according to the disclosure is utilized.

DETAILED DESCRIPTION

Figure 1:
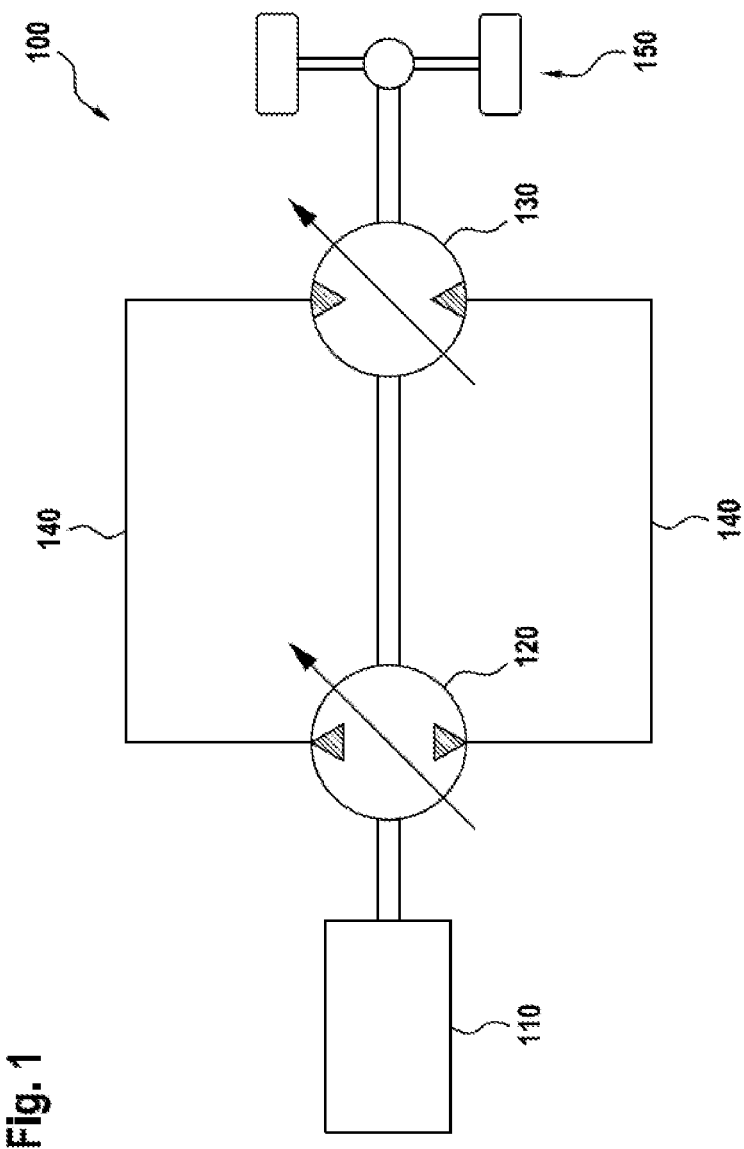
FIG. 1 schematically shows a hydrostatic drive which is suitable for carrying out a method according to the disclosure.

FIG. 1 schematically shows, by way of example, a hydrostatic drive 100 comprising the components which are relevant for carrying out a method according to the disclosure. For the sake of clarity, the representation of further components is omitted here. A variable hydraulic pump 120 is connected to a variable hydraulic motor 130 by a closed hydraulic working circuit 140.

The hydraulic pump 120 is driven by a drive machine 110 and the hydraulic motor 130, in turn, drives a propulsive drive 150. In the example shown, this can be, for example, a hydrostatic drive for a vehicle. When the hydrostatic drive is used for a stationary machine, the propulsive drive 150 is therefore replaced by another suitable component, for example, a grinding mechanism.

The drive machine 110 will not be specified in greater detail in this example, but possible drive machines are internal combustion engines such as, for example, an internal combustion engine (ICE), i.e., internal combustion engines according to the Diesel cycle, the Otto cycle, or the Seilinger process. Engines having an external heat supply are likewise conceivable. Instead of an internal combustion engine, an electric machine or a turbomachine (turbine) can also be used.

The drive machine 110 can drive the hydraulic pump 120 either directly or by means of a transmission. A method according to the disclosure can be used both with open as well as closed hydraulic circuits, as shown in FIG. 1. It can also be used with fixed displacement motors or shift motors, and not only with variable hydraulic motors, as shown in FIG. 1.

The manipulated variables which are relevant for a method according to the disclosure are the pressure $p_H$ in the hydraulic working circuit, the speed $n_P$ of the hydraulic pump, and an output variable of the hydrostatic drive. This output variable can be either an output variable of the hydraulic motor or also a variable of the propulsive drive, if one is provided.

In the case of direct output variables at the hydraulic motor, the relevant controlled variable is one of the variables rotational angle $\varphi_M$, speed $n_M$, and torque $M_M$ of the hydraulic motor. In this regard it is noted that only one of these three variables is considered to be the controlled variable in each case; the two others therefore arise on their own.

In the case of derived output variables for a propulsive drive, the relevant controlled variable is one of the variables driving distance $s_{veh}$, driving speed $v_{veh}$, and tractive force $F_Z$ of the propulsive drive. Only one of these three variables is considered to be the controlled variable in this case as well. In addition, it is noted that these three variables can be converted into the three aforementioned variables, for example, with consideration for the gear ratio and the wheel circumference.

The manipulated variables which are relevant for a method according to the disclosure are a torque $M_{M,St}$ of the drive machine, a control pressure $p_{P,St}$ for changing the volumetric displacement (in this case, for example, by outwardly pivoting a swash plate of the hydraulic pump, which therefore corresponds to a volumetric displacement of the hydraulic pump), as well as a displacement volume $v_{M,St}$ of the hydraulic motor. The specification of the volumetric displacement of the pump or of the displacement volume of the hydraulic motor can take place in different ways in each case (for example, directly by specifying the position or indirectly by specifying the pressure), as mentioned above.

Figure 2:
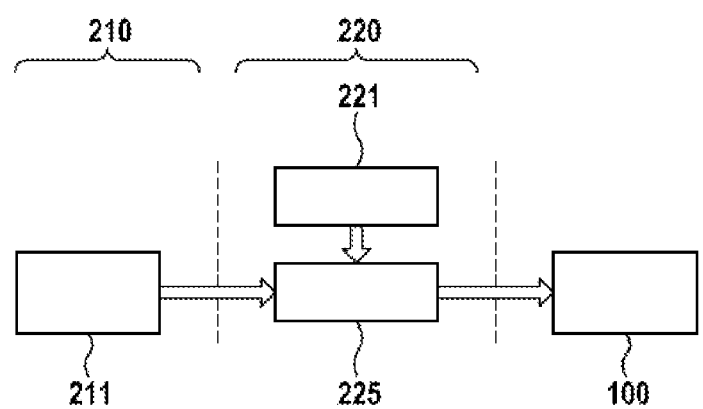
FIG. 2 shows a block diagram of an integration of a method according to the disclosure into a device which is driven by a hydrostatic drive.

FIG. 2 shows a block diagram of an integration of a method according to the disclosure into a device, for example, a vehicle, which is driven by a hydrostatic drive. In this case, a distinction can be made between two domains, namely vehicle 210 and drive 220.

Figure 3:
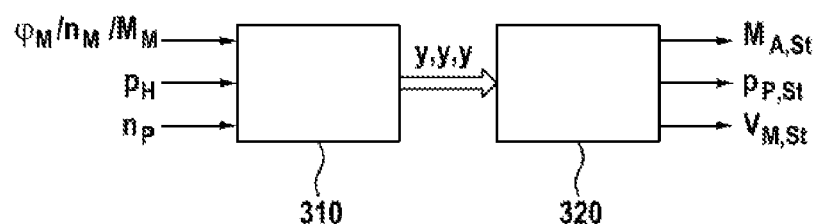
FIG. 3 schematically shows a sequence of a preferred embodiment of a method according to the disclosure.

In the vehicle 210 domain, vehicle functions 211 are set or specified, for example, by an operator or by safety systems. In the drive domain 220, data 221 for the drive train or the hydrostatic drive are set and/or specified. In addition, a precontrol 225 is carried out in the drive domain 220, by means of which manipulated variables can be ascertained from specified controlled variables. Reference is made here to FIG. 3 and the associated description with respect to the mode of operation of the precontrol. The manipulated variables are subsequently transferred by the precontrol 225 to the hydraulic drive 100 or are set there.

The controlled variables which can be specified by the vehicle functions 211 include, in this case, rotational angle $\varphi_M$, speed $n_M$, and torque $M_M$ (or also, therefore, driving distance $s_{veh}$, driving speed $v_{veh}$, and tractive force $F_Z$), as well as speed $n_P$.

The data 221 for the hydrostatic drive include, in this case, the pressure $p_H$ in the hydraulic working circuit. Specifications, in particular, of the hydrostatic drive are taken into consideration here, such as, for example, protection of the individual components of the drive, a maximum permissible pressure in the working circuit, an efficiency of the hydrostatic drive, or a time behavior of the components. In addition, the speed $n_P$ of the hydraulic pump can also be specified here, provided a request therefor from the vehicle functions is not present. An optimization, for example, with respect to an overall efficiency of the hydrostatic drive, including the working machine, can be carried out in this case.

FIG. 3 schematically shows a sequence of a preferred embodiment of a method according to the disclosure, in particular a precontrol. Initially, filtered setpoint values y and their time derivatives $\dot{y}$, $\ddot{y}$, ... of the first and higher orders are ascertained from the controlled variables pressure $p_H$, speed $n_P$, and one of the variables rotational angle $\varphi_M$, speed $n_M$, and torque $M_M$ within the scope of trajectory planning 310. The orders to be utilized depend on the selected model of the controlled system. At least one of the controlled variables is specified as a target variable in this case; the others are then automatically adapted or updated accordingly. For the sake of completeness, it is also noted that, instead of the three variables rotational angle $\varphi_M$, speed $n_M$, and torque $M_M$, it is also possible to use the three variables driving distance $s_{veh}$, driving speed $v_{veh}$, and tractive force $F_Z$, depending on the application.

In general, the target variables from the vehicle functions or the data for the hydrostatic drive can have any type of time behavior, and can also have jumps, in particular. The trajectory planning 310 transforms the specifications into a time behavior which can be implemented by the controlled system. Low-pass filters are preferably utilized for the trajectory planning 310, the order of which is oriented toward the orders of the required time derivatives of the filter variable.

In the further course, the manipulated variables torque $M_{A,St}$, control pressure $p_{P,St}$, and displacement volume $V_{St}$ are ascertained from the filtered setpoint values or time derivatives y, $\dot{y}$ and $\ddot{y}$ within the scope of a dynamic path model 320.

The dynamic path model is derived, for example, from a physically based system of differential equations of the drive train. In this case, a system of differential equations having the following form is set up for the drive train:

$$\dot{x} = f(x,u),$$

$$y = g(x,u)$$

wherein u is the vector of the manipulated variables, x is the vector of the state variables, and y is the vector of the controlled variables.

In this case, the selected system of differential equations must satisfy the system property of so-called "flatness". The system of differential equations can then be transformed, for example, into a representation according to the following equation:

$$u = h(y, \dot{y}, \ddot{y}, \ldots).$$

The vector function h in this case is an implementation of the aforementioned dynamic path model 230. As mentioned above, the orders of the derivative of the filtered setpoint values y depend on the model which is used.

The system of differential equations for the exemplary drive train is as follows:
Hydraulic motor:

$$\dot{V}_{M,St}=f_1(V_M,V_{M,St},p_H)$$

$$\dot{n}_M=f_2(M_M,M_{ZM})$$

$$\dot{\varphi}_M=f_3(n_M).$$

Hydraulic pump:

$$\dot{V}_P=f_4(V_P,n_P,p_H,p_{P,St})$$

$$\dot{n}_P=f_5(M_P,M_A,M_{ZP}).$$

Pressure in the working circuit:

$$\dot{p}_H=f_{6,1}(p_H,V_P,n_P,V_M,n_M,q_Z)$$

$$p_H=f_{6,2}(V_P,n_P,V_M,n_M,q_Z).$$

and torque of the drive machine:

$$\dot{M}_A=f_7(M_A,M_{A,St}).$$

There are two alternative modelings for the pressure in the working circuit. In the case of short, stiff working lines, the time behavior of the pressure is a great deal faster, for example, than the activating times of the hydraulic components. The pressure in the working circuit can then be described analytically according to $f_{6,2}$. If the time behavior of the pressure in the working circuit is in the same order of magnitude or is greater than the time behavior of the other components (for example, by a memory), however, the modeling $f_{6,1}$ must be selected.

The precontrol can be improved by accounting for disturbance variables which act on the drive. These options are $M_{ZP}$ (additional load moment at the hydraulic pump, for example, power take-off shafts), $M_{ZM}$ (total running resistance), and $q_Z$ (leakage in the working circuit). These and further variables can be ascertained via measurement or calculation and can be incorporated into the calculation of the precontrol values.

In addition to a physically based modeling of the drive train, a data-based modeling is also possible. Examples thereof are transfer functions (polynomials) from a path identification or also models based on neural networks.

FIGS. 4(a), 4(b), 5(a), 5(b), 6(a), 6(b), 7(a), 7(b), 8(a), and 8(b) show examples of courses of controlled variables (in part (a) of each figure) and manipulated variables (in part (b) of each of the figures) over time t upon specification of a setpoint value of a controlled variable in each case when a preferred embodiment of a method according to the disclosure is utilized. In each case, setpoint values and actual values of the controlled variables are shown with indices "setpoint" and "actual", respectively, and are shown for the manipulated variables with indices "St" and "actual", respectively.

The y-axes show the displacement s in m, torque M in Nm, speed n in l/min, pressure p in bar, and displacement volume V in cm³.

In order to facilitate understanding, the examples show the guidance when a setpoint value of a controlled variable is changed in each case, while each of the two further setpoint values of the controlled variables remains unchanged. It becomes clear in this case that, as a rule, all three manipulated variables must be changed in order to implement these specifications. In addition, it is apparent that the controlled system (drive train) follows the setpoint values quasi ideally (in this context, when the setpoint values are constant, the scale of the y-axis must also be taken into consideration). In practical use, changes in the setpoint values also occur simultaneously, for example, a higher torque at the hydraulic motor and, simultaneously, a higher pressure in the working circuit can be demanded. This can also be implemented using a method according to the disclosure.

FIGS. 4(a) and 4(b) show the guidance upon specification of a driving distance $s_{veh}$. Potential applications are, for example, agricultural engineering or material handling. When used for harvesting, the grain tank of combine harvesters is unloaded, during the working travel, into a trailer (towed by a tractor) traveling adjacent thereto. In order to load the trailer preferably evenly, the relative position of the combine harvester and the tractor must be varied. This application can be mapped onto the control of a driving path.

When container ships are unloaded, the container transporters must receive the container at a precisely specified position. A spreader of the crane simultaneously deposits four containers, for example, onto the correspondingly positioned transporters. The approach by the transporters to this position can likewise be implemented in the manner shown.

FIGS. 5(a) and 5(b) show the guidance upon specification of a speed $n_M$ of the hydraulic motor. Potential applications are airport devices, construction machines, or agricultural engineering. Machines of the GSE (ground support equipment) are used on the apron and, in some cases, also within the terminals. A reduced maximum speed must be adhered to in the terminal, for safety reasons. The entry into and exit out of these safety zones can be implemented by means of a method according to the disclosure.

The grinding mechanisms of stone crushers are speed-controlled depending on the material to be crushed, etc. The precontrol can be utilized when the speed specification changes.

Some telescopic handlers are equipped with shift-on-fly transmissions. During the shifting process, the hydraulic motor (primary shaft) is separated from the secondary shaft and is coupled in again with a new transmission ratio. The speeds must be synchronized for this purpose. This can be easily mapped by means of the speed guidance shown.

FIGS. 6(a) and 6(b) show the guidance upon specification of a torque $M_M$ of the hydraulic motor. Potential applications are construction machines or municipal machines and street sweepers. An essential criterion for a wheeled loader is, for example, the controllable implementation of the propulsive force. The driver requires feedback from the machine on the resistances which just occurred. These requests are ideally solved by the interpretation of the gas pedal as a request for tractive force and an implementation of the same by a method according to the disclosure.

Municipal machines and street sweepers are supposed to have a continuously increasing driving speed and therefore require brake control systems. Upon engagement of a brake control system (ESP) for stabilizing the vehicle, the propulsive drive must implement a specified drive torque. This application corresponds to the case which is shown.

FIGS. 7(a) and 7(b) show the guidance upon specification or change of a pressure $p_H$ in the working circuit. This concept is generally usable. The pressure or the high pressure in the working circuit should be guided, for example, in order to implement component protection, set the optimal efficiency of the hydrostatic drive or, in the case of a secondary control, to provide the necessary working pressure.

Figure 8A:
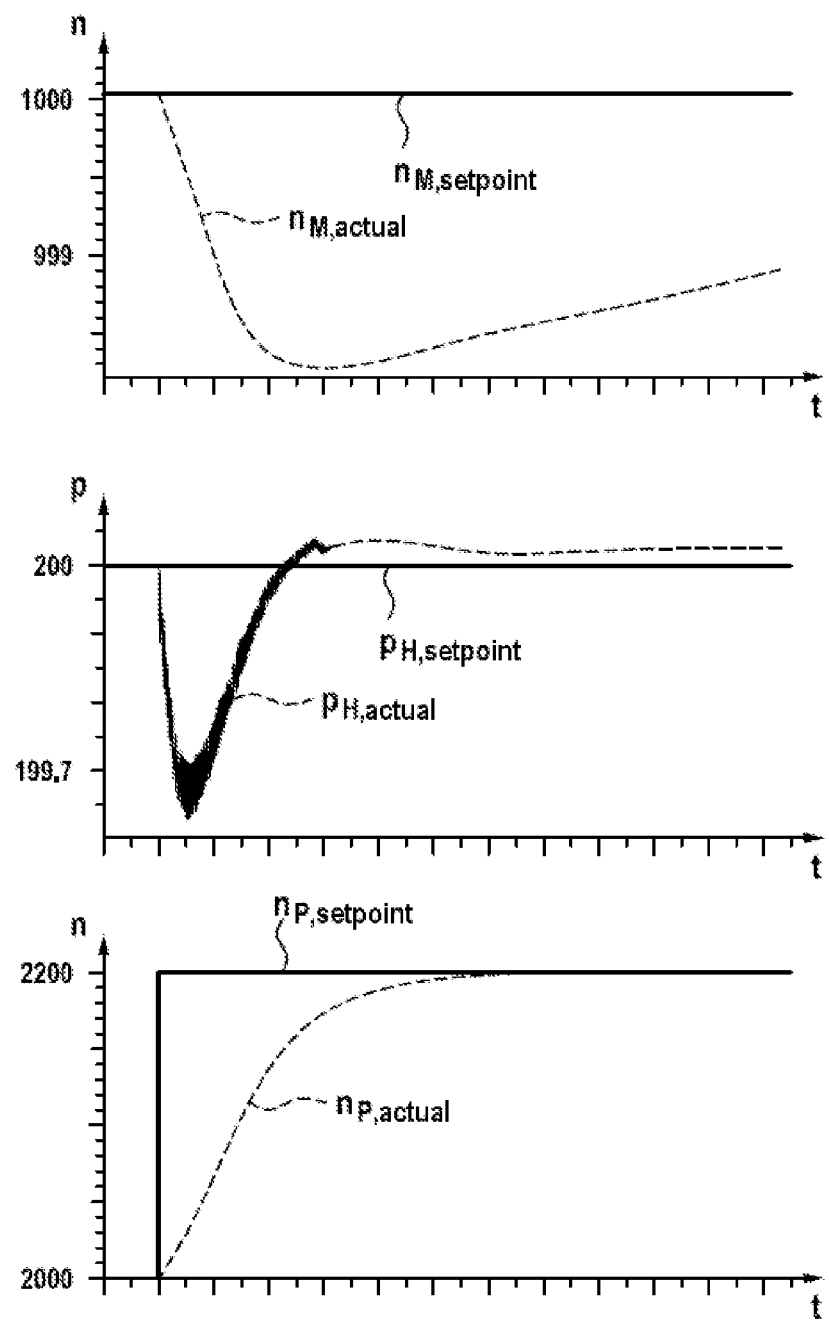

FIGS. 8(a) and 8(b) show the guidance upon specification or change of a speed $n_p$ of the hydraulic pump (or the working machine coupled thereto). Potential applications in this case are agricultural technology or material handling. Agricultural and municipal machines are often equipped with mechanical power take-off shafts for driving mounted implements or towed working machines. The power take-off shaft has a transmission ratio, which is fixed or variable in a few stages, with respect to the drive machine (usually an internal combustion engine). An exact speed must be set in order to achieve a desired working result. This is easily mapped using the algorithm shown.

Fork lifters are typically equipped with constant-delivery pumps (gear pumps) for the working hydraulics. In order to achieve a rapid working motion, for example, a lifting of the load, the speed of the working machine must be dynamically adapted. The algorithm shown ideally accomplishes this without influencing the propulsive drive.

The invention claimed is:

1. A method for controlling a hydrostatic drive, which includes a drive machine operably connected to a hydraulic pump and a hydraulic motor operably connected to the hydraulic pump via a hydraulic working circuit, the method comprising:
    performing a precontrol operation, which comprises:
        based on a specified setpoint target value for at least one controlled variable of a plurality of controlled variables, determining trajectories of all remaining controlled variables of the plurality of controlled variables, the plurality of controlled variables including a pressure in the hydraulic working circuit, a speed of the hydraulic pump, and an output variable of the hydrostatic drive; and
        based on the specified setpoint target value for the at least one controlled variable and the determined trajectories all remaining controlled variables, determining dynamic paths for a plurality of manipulated variables, the plurality of manipulated variables being operating variables that achieve the specified setpoint target value for the at least one controlled variable; and
    after the precontrol operation, operating the hydrostatic drive based on the determined plurality of manipulated variables.

2. The method according to claim 1, wherein the output variable of the hydrostatic drive is one of a rotational angle of the hydraulic motor, a speed of the hydraulic motor, and a torque of the hydraulic motor.

3. The method according to claim 1, wherein:
    the hydraulic motor is coupled to a propulsive drive, and
    the output variable of the hydrostatic drive is one of a driving distance of the propulsive drive, a driving speed of the propulsive drive, and a tractive force of the propulsive drive.

4. The method according to claim 1, wherein the at least one controlled variable is at least one of the output variable of the hydrostatic drive and the speed of the hydraulic pump, the precontrol operation further comprising:
    receiving the specified setpoint target value from one of a machine driven by the hydrostatic drive and a vehicle driven by the hydrostatic drive.

5. The method according to claim 1, wherein the at least one controlled variable is at least one of the pressure in the hydraulic working circuit and the speed of the hydraulic pump, the precontrol operation further comprising:
    recalling the specified setpoint target value from data stored in the hydrostatic drive.

6. The method according to claim 5, wherein the data stored in the hydrostatic drive includes at least one of a maximum permissible pressure in the hydrostatic drive, an efficiency of the hydrostatic drive, a time behavior of components of the hydrostatic drive, and protection of components of the hydrostatic drive.

7. The method according to claim 1, wherein the plurality of manipulated variables of the hydrostatic drive includes (i) a torque of the drive machine, (ii) a volumetric displacement of the hydraulic pump or a first control pressure that sets said volumetric displacement, and (iii) a displacement volume of the hydraulic motor or a second control pressure that sets said displacement volume.

8. The method according to claim 7, wherein the determining of the trajectories of all remaining controlled variables includes:
    determining filtered setpoint values for each of the controlled variables and at least one time derivative of the determined filtered setpoint values based on the specified target setpoint value of the at least one controlled variable.

9. The method according to claim 8, wherein the determining of the dynamic paths for the plurality of manipulated variables includes determining the dynamic paths based on actual values of the plurality of controlled variables and the plurality of manipulated variables, on the determined filtered setpoint values and on the at least one time derivative of the determined filtered setpoint values, and on the specified setpoint target value.

10. The method according to claim 1, wherein the drive machine comprises an internal combustion engine, an electric machine, or a turbomachine.

11. The method of claim 1, wherein the method is carried out by a processing unit.

12. The method of claim 11, wherein the processing unit is triggered to carry out the method by a computer program.

13. The method of claim 12, wherein the computer program is stored on a non-transitory machine-readable storage medium.

* * * * *